US006073602A

United States Patent [19]

Muta

[11] Patent Number: 6,073,602

[45] Date of Patent: Jun. 13, 2000

[54] PISTON FOR INTERNAL-COMBUSTION ENGINE

[75] Inventor: Hisakazu Muta, Kanagawa, Japan

[73] Assignee: Unisia Jecs Corporation, Atsugi, Japan

[21] Appl. No.: 09/116,544

[22] Filed: Jul. 16, 1998

[30] Foreign Application Priority Data

Jul. 16, 1997 [JP] Japan .................................... 9-207318

[51] Int. Cl.[7] .................................... F16J 1/00; F02F 3/00

[52] U.S. Cl. .................................................. 123/193.6

[58] Field of Search ........................... 123/193.6; 92/208, 92/209, 238, 239

[56] References Cited

U.S. PATENT DOCUMENTS

| | | | |
|---|---|---|---|
| 4,683,808 | 8/1987 | Wacker et al. | 92/208 |
| 4,694,735 | 9/1987 | Tatematsu et al. | 92/209 |
| 5,054,375 | 10/1991 | Kawabata et al. | 92/208 |
| 5,063,893 | 11/1991 | Iwaya | 92/238 |
| 5,299,490 | 4/1994 | Harrer et al. | 123/193.6 |
| 5,857,440 | 1/1999 | O'Dowd et al. | 123/193.6 |
| 5,894,824 | 4/1999 | Watanabe et al. | 123/193.6 |

*Primary Examiner*—Marguerite McMahon
*Attorney, Agent, or Firm*—Foley & Lardner

[57] ABSTRACT

A piston comprises a ring land extending to a crown, a pin boss formed in a lower side of the ring land, a piston pin bore formed in the pin boss and a skirt section extending to the ring land. The skirt section is formed in such a manner that an area of a thrust side skirt is greater than an area of a counter-thrust side skirt. The thrust side skirt is formed so as to become thinner in wall thickness in a portion closer to the ring land and a portion farther from the ring land than in a central portion on both sides of a middle position along circumferential direction around a piston center line substantially perpendicular to an axis line of the piston pin bore and a wall thickness of a portion between the closer portion and the central portion and a wall thickness of a portion between the central portion and the farther portion vary gradually. The thrust side skirt is formed so as to become gradually thinner in wall thickness from a portion closer to the ring land to a portion farther from the ring land on both sides of the middle portion along the circumferential direction around the piston center line substantially perpendicular to the axis line of the piston pin bore.

7 Claims, 4 Drawing Sheets

PISTON FOR INTERNAL-COMBUSTION ENGINE

BACKGROUND OF THE INVENTION

The present invention relates to a piston for an internal-combustion engine.

The piston for the internal-combustion engine is fitted in a cylinder with a predetermined clearance and reciprocates in the cylinder. At this time, because a connecting rod supports the piston in a state that the connecting rod inclines from rightward to leftward, the piston slides in a reciprocating motion in a state that the piston is pressed to the inner surface of the cylinder by a side force of right or left direction.

Because the side force is great and the effect of a partial thrust force on the inner surface of the cylinder causes a deficiency such as a seizure, it is effective for avoiding the deficiency that the thrust force is dispersed and the surface pressure is lowered by making the area the skirt section of the piston contacts with the inner surface of the cylinder become great.

However, if the area on which the skirt section of the piston contacts with the inner surface of the cylinder becomes greater, a friction loss during the sliding motion of the piston becomes greater.

Therefore, Japanese Unexamined (KOKAI) Utility Model Publication No. 64(1989)-3054 discloses an unsymmetrical piston in which the area of a thrust side skirt which contacts with the inner surface of the cylinder during an expansion stroke and is effected by a great thrust force and the area of a counter-thrust side skirt is small.

With this, it is possible to gain the piston for the internal-combustion engine in which the thrust force can be dispersed, the surface pressure can be lowered and the increase of the friction loss can be controlled.

When the piston reciprocates in the cylinder, if the side force changes the direction, it is apprehended that the piston moves from one side to the other side and the collision between the piston and the inner surface of the cylinder causes a piston slap and a noise.

As a countermeasure against the noise, it is effective that the lower portion of the skirt section of the piston loosely contacts with the inner surface of the cylinder. However, in the conventional example, the wall thickness of the skirt section is substantially constant. The dimension of the wall thickness is chosen so as to secure a rigidity bearable to a great side force at a time of a high output of an engine.

In the conventional example, the piston includes enough rigidity at the time of the high output of the engine and it is possible to control the friction loss during the sliding motion of the piston. However, it is apprehended that the noise is generated when the skirt section of the piston contacts with the inner surface of the cylinder.

SUMMARY OF THE INVENTION

It is therefore an object of the present invention to provide a piston for an internal-combustion engine capable of dispersing a thrust force, lowering a surface pressure, controlling an increase of a friction loss during a sliding motion of the piston and preventing the generation of a noise.

According to the present invention, a piston for an internal-combustion engine comprises:

a ring land extending to a crown;

a pin boss formed in a lower side of the ring land;

a piston pin bore formed in the pin boss; and a skirt section extending to the ring land, said skirt section comprising a thrust side skirt which contacts with an inner surface of a cylinder during an expansion stroke and a counter-thrust side skirt and an area of the thrust side skirt is greater than an area of the counter-thrust side skirt.

In one embodiment, the thrust side skirt is formed so as to become thinner in wall thickness in a closer portion to the ring land and a farther portion from the ring land than in a central portion on both sides of a middle position along a circumferential direction around a piston center line substantially perpendicular to an axis line of the piston pin bore and a wall thickness of a portion between the closer portion and the central portion and a wall thickness of a portion between the central portion and the farther portion vary gradually.

In another embodiment, the thrust side skirt is formed so as to become gradually thinner in wall thickness from a closer portion to the ring land to a farther portion from the ring land on both sides of a middle position along circumferential direction around a piston center pin substantially perpendicular to the axis line of the piston pin bore.

In this construction, the piston functions in a state that the piston is installed inside a cylinder of an engine not shown in the drawing and slides in a reciprocating motion in a state that the piston is pressed to the inner surface by a side force in right and left direction.

At this time, because the area of the thrust side skirt affected by a great thrust force is greater than the area of the counter-thrust side skirt of the piston and the piston is unsymmetrical, the thrust force is dispersed by a great pressure receiving area maintained against the great thrust force, a surface pressure is kept low, the increase of a friction loss is lowered and a smooth operation is performed.

On the other hand, during the reciprocating sliding motion, if the side force changes the direction, it is apprehended that the piston moves from one side to the other side and the collision between the piston and the inner surface of the cylinder causes a piston slap and a noise. However, the present invention can solve these problems.

In the piston of the present invention, the thrust side skirt is formed so as to become thinner in wall thickness in a portion closer to the ring land and a portion farther from the ring land than in a central portion on both sides of a middle portion along circumferential direction around a piston center line substantially perpendicular to the axis line of the piston pin bore. The wall thickness of a portion between the closer portion and the central portion and the wall thickness of a portion between the central portion and the farther portion vary gradually.

When the piston contacts with the inner surface of the cylinder because of the change of the direction of the side force, the piston contacts slowly with the inner surface of the cylinder by a thin portion at a lower side of the skirt section. The piston slap is lightened and the generation of the noise is prevented.

The skirt section supports the thrust force generated at the time of the high output of the engine by the sufficient rigidity.

Therefore, it is possible to disperse the thrust force, to lower a surface pressure, to control the increase of the friction loss during a sliding motion of the piston and to gain a piston for an internal-combustion engine enable to prevent the generation of the noise.

DETAILED DESCRIPTION OF THE INVENTION

Figure 1:
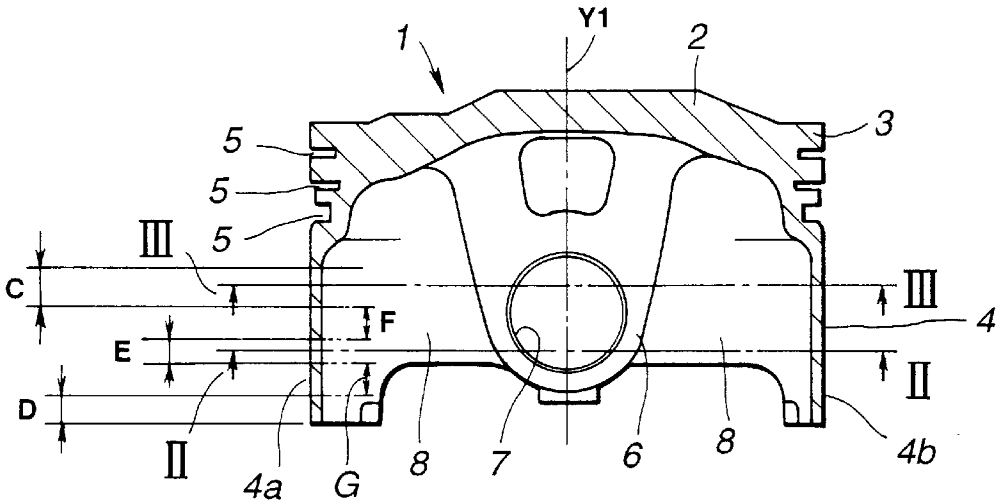
FIG. 1 is a sectional view showing one embodiment of a piston for internal-combustion engines of the present invention.

The following is an explanation of a piston for an internal-combustion engine according to the present invention with reference to the drawings.

In the first embodiment, the piston for the internal-combustion engine shown by a reference numeral 1 in the drawings is made from an aluminum alloy material. The piston 1 comprises a crown 2 in the uppermost end in FIG. 1, a ring land 3 extending to the crown 2 and a skirt section 4 extending to the ring land 3. In this embodiment, three piston ring grooves 5 are formed in the ring land 3.

A reference numeral 6 shows a pin boss formed under the ring land 3. Confronting pin bosses 6 are formed on both sides of an axis line Y1 (Refer to FIG. 2). A piston pin bore 7 passes through the pin bosses 6 and is formed in the pin bosses 6. An axis line X1 of the piston pin bore 7 is substantially perpendicular to the axis line Y1 of the piston 1.

The skirt section 4 is formed in only a region which is substantially perpendicular to the axis line X1 of the piston pin bore 7 formed in the pin bosses 6. The area of a thrust side skirt 4*a* is greater than the area of a counter-thrust side skirt 4*b*. The skirt section 4 (the thrust side skirt 4*a* and the counter-thrust side skirt 4*b*) is formed unsymmetrically with respect to the axis line X1 of the piston pin bore 7.

The skirt section 4 is connected to the pin bosses 6 by connecting beams 8. The connecting beams 8 extend to an end portion of the thrust side skirt 4*a* and an end portion of the counter-thrust side skirt 4*b* from the outer circumference of the pin bosses 6. The top ends of the connecting beams 8 are connected to the ring land 3.

Figure 4:
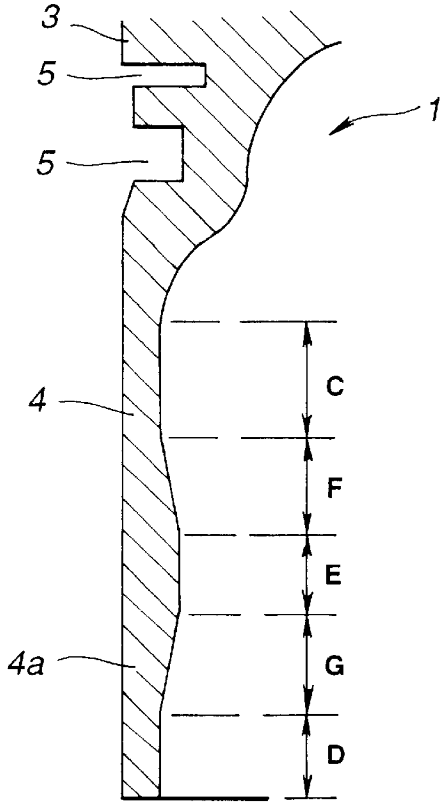
FIG. 4 is an enlarged sectional view taken along the line of IV—IV of FIG. 2.

The thrust side skirt 4*a* is formed so as to become thinner in wall thickness in a portion closer to the ring land 3 (C region) and a portion farther from the ring land 3 (D region) than in a central portion (E region) on both sides, along a circumferential direction, of a position substantially perpendicular to the axis line X1 of the piston pin bore 7. The wall thickness of a portion (F region) between the C region and the E region and the wall thickness of a portion (G region) between the E region and the D region vary gradually (Refer to FIG. 4).

Figure 2:
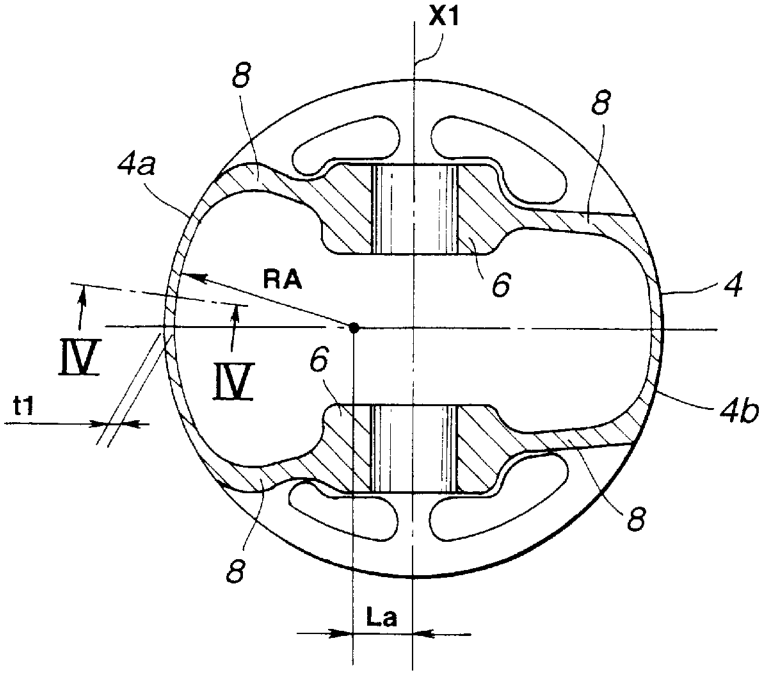
FIG. 2 is a sectional view taken along the line of II—II of FIG. 1.
Figure 3:
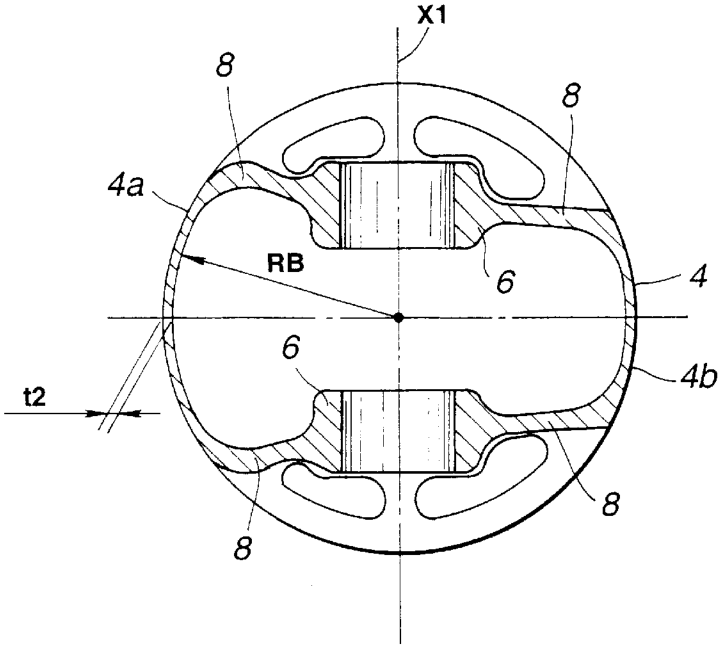
FIG. 3 is a sectional view taken along the line of III—III of FIG. 1.

As shown in FIG. 2, an inner circumferential surface of the thrust side skirt 4*a* is formed in a circle with a radius RA on a center closer to the thrust side skirt 4*a* by a distance La from the axis line X1 of the piston pin bore 7 at a middle portion which is the E region. As shown in FIG. 3, in the C region, the inner circumferential side of the thrust side skirt 4*a* is formed in a circle with a radius RB on the axis line X1 of the piston pin bore 7. In the D region, the inner circumferential side of the thrust side skirt 4*a* is formed in a circle with a radius RB on the axis line X1 of the piston pin bore 7 like the C region.

In the F region between the C region and the E region and the G region between the E region and the D region, the center position moves gradually from the axis line X1 of the piston pin bore 7 to a position by a distance La and the radius varies from RB to RA and thereby the wall thickness between the C region and the E region and the wall thickness between the E region and the D region vary gradually and smoothly. That is, the wall thickness between the C region and the E region varies gradually and smoothly from the C region to the E region and the wall thickness between the E region and the D region varies gradually and smoothly from the E region to the D region.

Therefore, the wall thickness of the center portion of the thrust side skirt 4*a* (E region) becomes gradually thicker from a position substantially perpendicular to the axis line X1 of the piston pin bore 7 to the circumferential direction.

The wall thickness at the position substantially perpendicular to the axis line X1 of the piston pin bore 7 is formed in such a manner that the wall thickness t1 (Refer to FIG. 2) at a section taken along the line of II—II it of FIG. 1 (the section of the E region) is greater than the wall thickness t2 (Refer to FIG. 3) at a section taken along the line of III—III of FIG. 1 (the section of the C region and the D region) or the wall thickness to is equal to the wall thickness t2.

In this construction, the piston 1 functions in such a manner that the piston 1 is installed inside a cylinder of an engine not shown in the drawing.

In this case, because a connecting rod not shown in the drawing supports the piston in a state that the connecting rod inclines from rightward to leftward, the piston 1 slides in a reciprocating motion in a state that the piston 1 is pressed to the inner surface of the cylinder by a side force of right or left direction.

At this time, because the area of the thrust side skirt 4*a* affected by a great thrust force is greater than the area of the counter-thrust side skirt 4*b* of the piston 1 and the piston 1 is unsymmetrical, the thrust force is dispersed by a great pressure receiving area against the great thrust force, a surface pressure is kept low, the increase of a friction loss is lowered and a smooth operation is performed.

On the other hand, during the reciprocating sliding motion, if the side force changes the direction, it is apprehended that the piston 1 moves from one side to the other side and the collision between the piston 1 and the inner surface of the cylinder causes a piston slap and a noise. However, the present invention can solve these problems.

In the piston 1 of the present invention, the thrust side skirt 4*a* is formed so as to become thinner in wall thickness in a portion closer to the ring land 3 (C region) and a portion farther from the ring land 3 (D region) than in a central portion (E region) on both sides of the middle portion along the circumferential direction around the piston center line substantially perpendicular to the axis line X1 of the piston pin bore 7. The wall thickness of a portion (F region) between the C region and the E region and the wall thickness of a portion (G region) between the E region and the D region vary gradually.

When the piston 1 contacts with the inner surface of the cylinder because of the change of the side force, the piston 1 contacts slowly with the inner surface of the cylinder by a thin portion where the rigidity is weakened at a lower side of the skirt section 4. The piston slap is lightened and the generation of the noise is prevented.

The thicker portion of the skirt section 4 supports the thrust force generated at the time of the high output of the engine by the sufficient rigidity.

Therefore, it is possible to disperse the thrust force, to lower a surface pressure, to control the increase of the friction loss during a sliding motion of the piston and to gain the piston 1 for the internal-combustion engine enable to prevent the generation of the noise.

One embodiment of the present invention is explained. However, the present invention is not limited to the embodiment. It is possible to change the embodiment without departing from the scope of the present invention. For example, it is possible to form the piston in such a manner that the wall thickness of the counter-thrust side skirt 4*b* is changed as same as the wall thickness of the thrust side skirt 4*a*. It is optionally possible to select an offset of the axis line X1 of the piston pin bore 7 in the thrust side or in the counter-thrust side.

According to the present invention, it is possible to disperse the thrust force, to lower the surface pressure, to control the increase of the friction loss during the sliding motion of the piston and to gain the piston for the internal-combustion engine enable to prevent the generation of the noise.

In the second embodiment, a piston for an internal-combustion engine shown by a reference numeral 1 in the drawings is made from an aluminum alloy material. The piston 1 comprises a crown 2 in the uppermost end in FIG. 5, a ring land 3 extending to the crown 2 and a skirt section 4 extending to the ring land 3. In this embodiment, three piston ring grooves 5 are formed in the ring land 3.

The thrust side skirt 4*a* is formed so as to gradually become thinner in wall thickness from a position closer to the ring land 3 to a position farther from the ring land 3 on both sides along a circumferential direction of a position substantially perpendicular to the axis line X1 of the piston pin bore 7.

Figure 5:
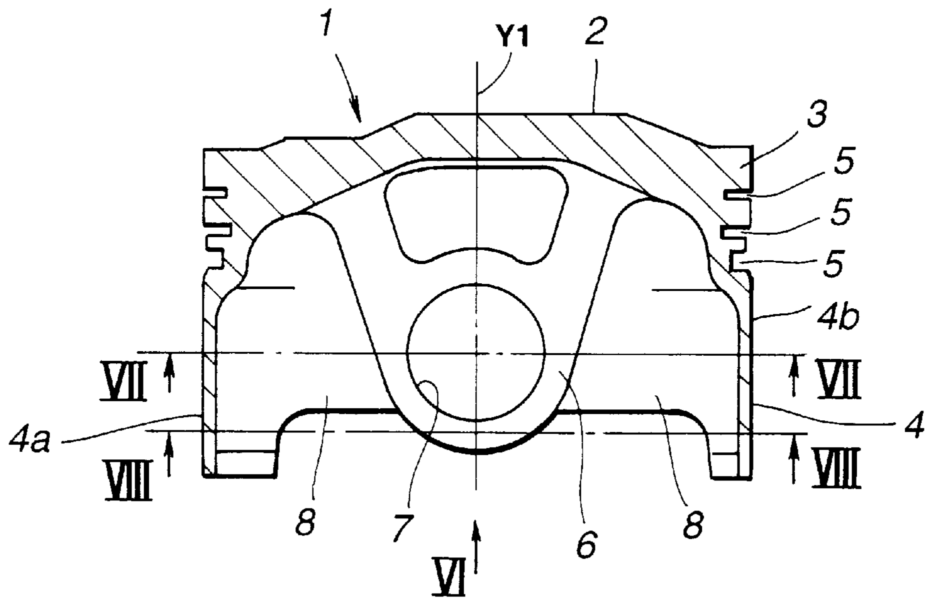
FIG. 5 is a sectional view showing another embodiment of a piston for internal-combustion engines of the present invention.
Figure 6:
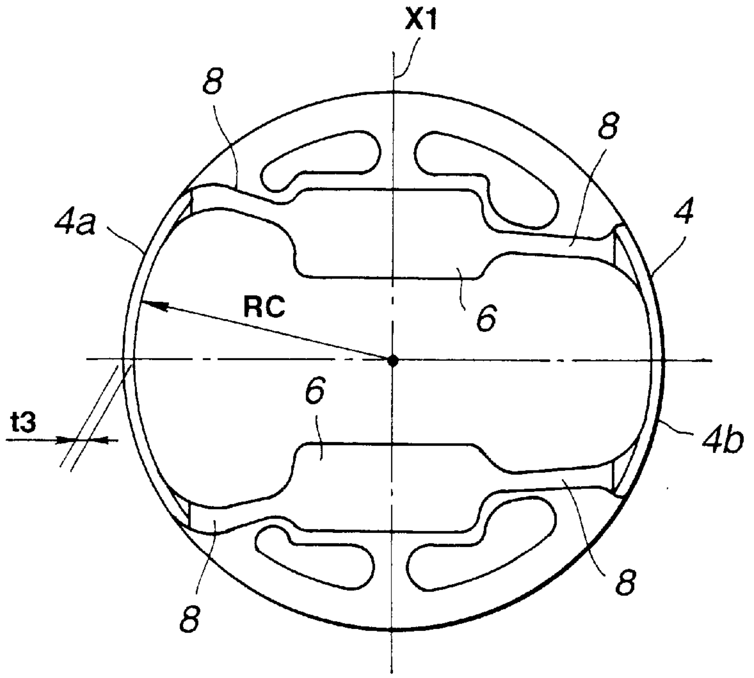
FIG. 6 is a sectional view from a direction of VI of FIG. 5.
Figure 7:
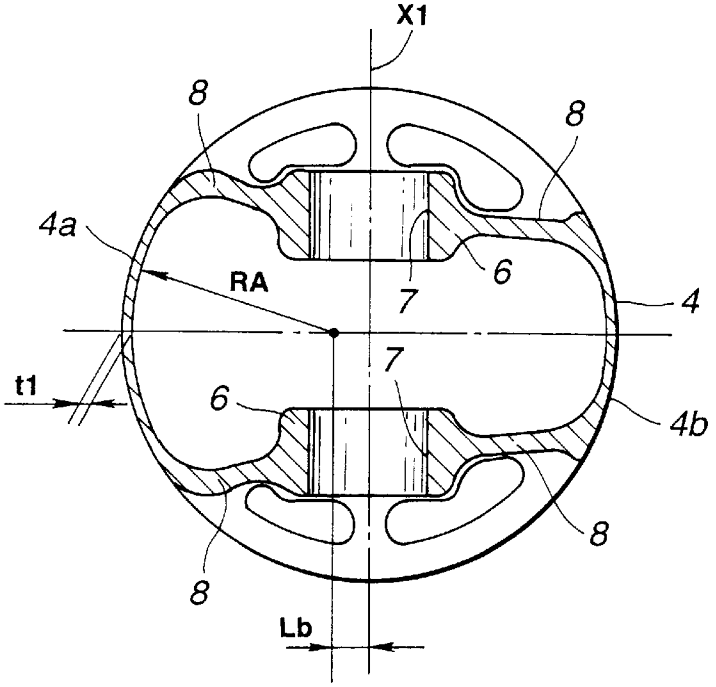
FIG. 7 is a sectional view taken along the line of VII—VII of FIG. 5.
Figure 8:
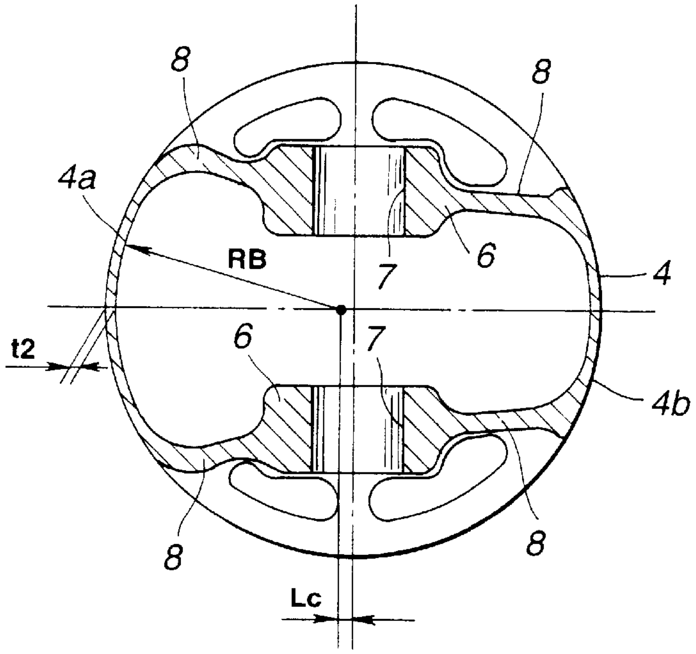
FIG. 8 is a sectional view taken along the line of VIII—VIII of FIG. 5.

The inner circumferential surface of the thrust side skirt 4*a* at a section of VII—VII of FIG. 5 is formed in a circle with a radius RA having a center at a position closer to the thrust side skirt 4*a* by a distance Lb from the axis line X1 of the piston pin bore 7 in a perpendicular direction (Refer to FIG. 7). The inner circumferential surface of the thrust side skirt 4*a* at a section of VIII—VIII of FIG. 5 is formed in a circle with a radius RB having a center at a position closer to the thrust side skirt 4*a* by a distance Lc from the axis line X1 of the piston pin bore 7 in a perpendicular direction (Refer to FIG. 8). The inner circumferential surface of the thrust side skirt 4*a* at a lower portion is formed in a circle with a radius RC at a center on the axis line X1 of the piston pin bore 7 (Refer to FIG. 6).

The dimension Lb is greater than the dimension Lc, the radius RA is smaller than the radius RB and the radius RB is smaller than the radius RC. Therefore, the thrust side skirt 4*a* is formed so as to become thinner in wall thickness from a position closer to the ring land 3 to a position farther from the ring land 3 on both sides along a circumferential direction of the position substantially perpendicular to the axis line X1 of the piston pin bore 7 and becomes gradually thicker from a position substantially perpendicular to the axis line X1 of the piston pin bore 7 to a circumferential direction.

The wall thickness at a position substantially perpendicular to the axis line X1 of the piston pin bore 7 is formed in such a manner that the wall thickness t1 in a section taken along the line of VII—VII of FIG. 5 is greater than the wall thickness t2 in a section taken along the line of VIII—VIII of FIG. 5. The wall thickness t2 in a section taken along the line of VIII—VIII of FIG. 5 is thicker than the wall thickness t3 at a lower portion. The wall thickness t1 is equal to the wall thickness t2 and the wall thickness t3.

In the piston 1 of the present invention, the thrust side skirt 4*a* is formed so as to become gradually thinner in wall thickness from a portion closer to the ring land 3 to a portion farther from the ring land 3 on both sides of circumferential direction along the position substantially perpendicular to the axis line X1 of the piston pin bore 7.

What is claimed is:

1. A piston for an internal-combustion engine, comprising:

a ring land extending to a crown;

a pin boss formed in a lower side of the ring land;

a piston pin bore formed in the pin boss; and a skirt section extending to the ring land, said skirt section comprising a thrust side skirt which contacts with an inner surface of a cylinder during an expansion stroke and a counter-thrust side skirt and an area of the thrust side skirt is greater than an area of the counter-thrust side skirt;

wherein the thrust side skirt comprises first and second lateral regions and a circumferential middle region that is located between the first and second lateral regions along a circumferential direction around a piston center line;

wherein each of the first and second lateral regions comprises an upper subregion that is located closer to the ring land, a lower subregion that is located farther from the ring land, and a middle subregion that is located between the upper subregion and the lower subregion;

wherein a wall thickness of the middle subregion is greater than that of the upper and lower subregions, and a wall thickness of a portion between the middle subregion and the upper subregion and a wall thickness of a portion between the middle subregion and the lower subregion are varied gradually; and wherein a wall thickness of a center region in the circumferential middle region that is substantially perpendicular to an axis line of the piston pin is substantially constant along the piston center line.

2. The piston for an internal-combustion engine as claimed in claim 1, wherein a wall thickness of the thrust side skirt becomes gradually thicker from the circumferential middle region to each of the first and second lateral regions along the circumferential direction around a piston center line.

3. The piston for an internal-combustion engine as claimed in claim 1, wherein each of the inner surfaces of the upper and lower subregions of the first and second lateral regions is disposed along a first arc of a circle that is centered at the piston center line;

wherein an inner surface of the circumferential middle region is disposed along a second arc of a circle that is centered at an offset center that is offset from the piston center line toward the middle region; and wherein an inner surface of the portion between the upper subregion and the middle subregion and an inner surface of the portion between the lower subregion and the middle subregion are disposed along a third arc that is centered at a third center that is varied gradually within the piston center line and the offset center along the direction perpendicular to the axis line of the piston pin.

4. The piston for an internal-combustion engine as claimed in claim 1, wherein the wall thickness of the center region is substantially constant from a portion that is perpendicular to the axis of the piston pin in the downward direction.

5. The piston for an internal-combustion engine as claimed in claim 1, wherein the thrust side skirt has an end portion that is connected to the pin boss by a connecting beam portion; and wherein each of the first and second lateral regions is extended from the end portion of the thrust side skirt to the circumferential middle region in circumferential direction around the piston center line.

6. The piston for an internal-combustion engine as claimed in claim 5, wherein a wall thickness of the thrust side skirt becomes gradually thicker from the circumferential middle regions to each of the first and second lateral regions along the circumferential direction around a piston center line.

7. An engine piston comprising:

a crown;

a ring land section extending beneath the crown;

a pin boss section defining a piston pin bore; and a skirt section comprising a smaller skirt extending from the ring land section and defining a minor thrust surface, and a larger skirt which extends from the ring land section, which defines a major thrust surface larger in area than the minor thrust surface, and which comprises first and second lateral regions and a circumferential middle region located between the first and second lateral regions along a circumferential direction around a piston center line, a wall thickness of the larger skirt in each of the first and second lateral regions being decreased gradually along the downward direction away from the ring land section;

wherein the wall thickness of the larger skirt is increased gradually from the circumferential middle region to each of the first and second lateral regions along the circumferential direction; and wherein each of the first and second lateral regions of the larger skirt comprises a center subregion which is located, along the downward direction, between an upper subregion closer to the ring land section and a lower subregion remoter from the ring land section and a lower subregion remoter from the ring land section than the upper subregion is, and the wall thickness of each of the first and second lateral regions of the larger skirt is greater in the center subregion than in the upper subregion and than in the lower subregion.

* * * * *